Dec. 31, 1963     E. C. STEINER     3,115,910
SCRIBE SAWS
Filed June 23, 1961     2 Sheets-Sheet 1
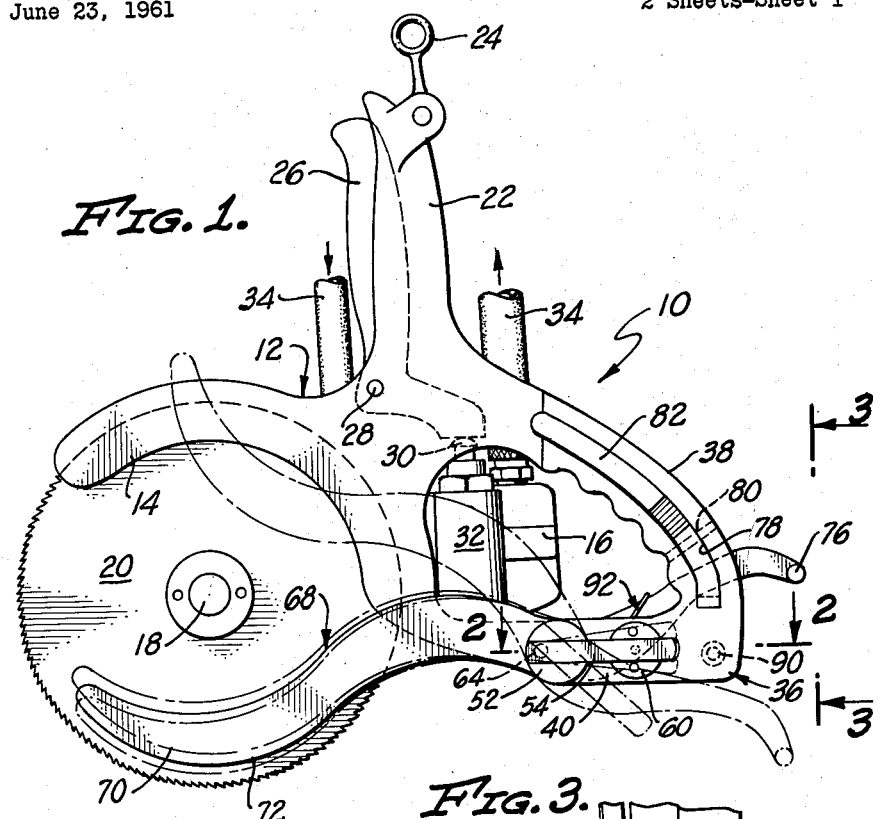
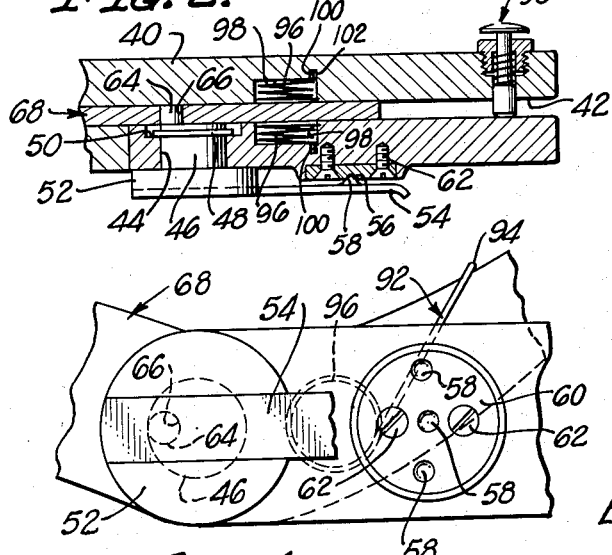
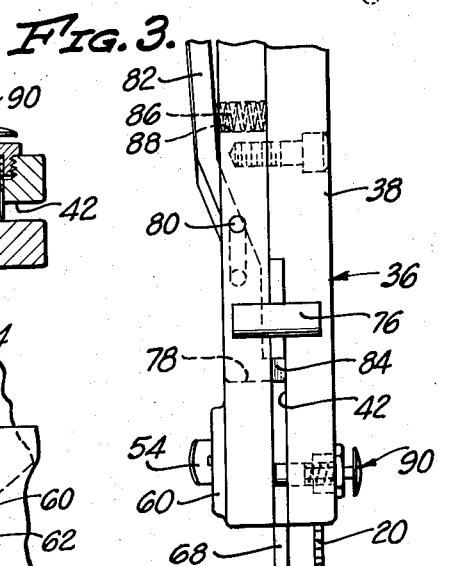
INVENTOR.
EZEKIEL C. STEINER
BY
O'BRIAN & BLACKHAM
ATTORNEYS Dec. 31, 1963     E. C. STEINER     3,115,910
SCRIBE SAWS
Filed June 23, 1961     2 Sheets-Sheet 2
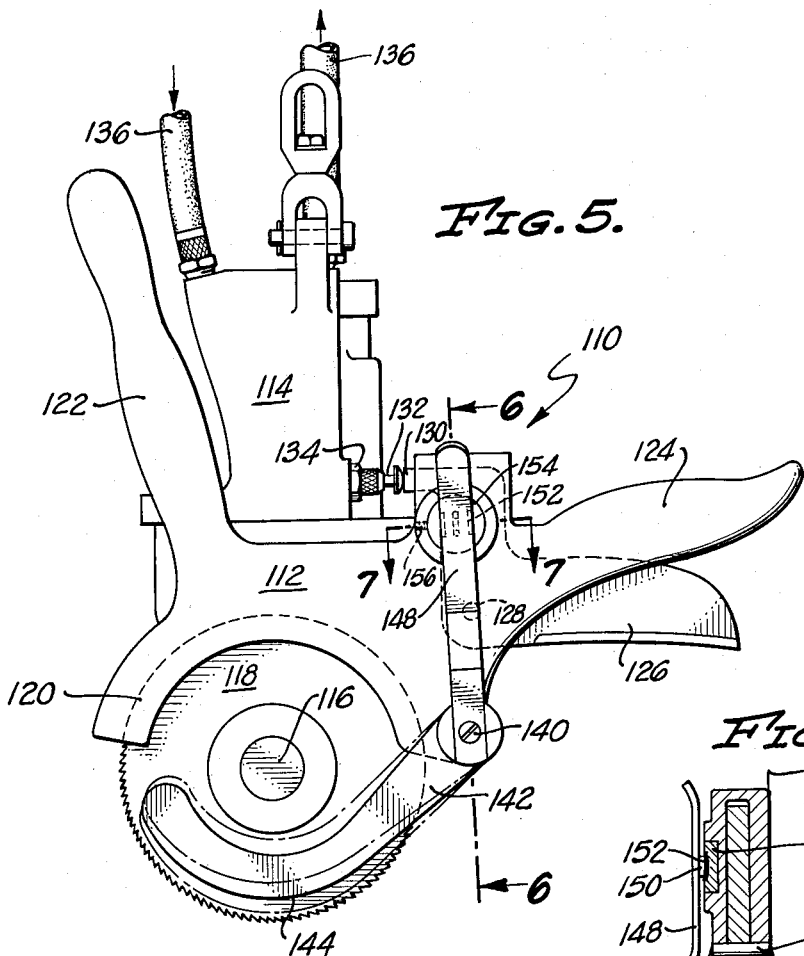
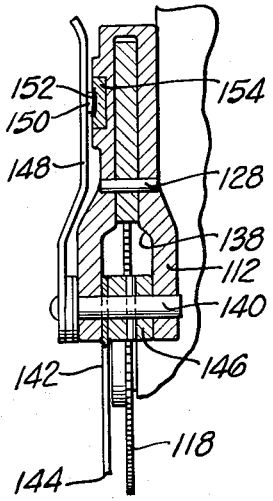
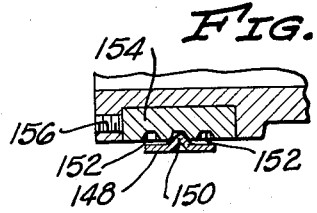
INVENTOR.
EZEKIEL C. STEINER
BY
O'BRIAN & BLACKHAM
ATTORNEYS United States Patent Office 3,115,910
Patented Dec. 31, 1963

1

3,115,910
SCRIBE SAWS
Ezekiel C. Steiner, 1438 E. Slauson Ave.,
Los Angeles, Calif.
Filed June 23, 1961, Ser. No. 119,116
1 Claim. (Cl. 143—43)

This invention pertains to new and improved scribe saws for use in the meat industry.

At one time the principal implement utilized in dressing down a meat carcass was a common knife. At the present time, however, economic considerations have made it mandatory for comparatively large meat packing establishments to utilize power operated equipment for many specific operations performed during the processing of a meat carcass. Thus, for example, specialized power saws have been developed for various operations such as, for example, severing sides of beef into primal sections, dehorning, dehiding and the like.

An object of the present invention is to provide new and improved power saws for use in scribing operations in dressing down a meat carcass. Because of their utility saws of the present invention may be termed "scribe saws." In use they are utilized in order to scribe meat sides such as pork sides to various predetermined depths and for other operations. A further object of the present invention is to provide scribe saws for use in performing scribing operations which may be easily and conveniently used for the intended purposes and which may be adjusted so as to achieve various cuts of various depths as may be required. Other objects of the present invention are to provide scribe saws which are comparatively simple to construct, easy to maintain in an operative condition, and which are easy to maintain so as to preserve the requisite standards of cleanliness in the meat field.

These and various other objects of this invention, as well as many specific advantages of it, will be more fully apparent from a detailed consideration of the remainder of this specification including the appended claim and the accompanying drawings in which:

FIG. 1 is a side elevational view of a scribe saw of this invention capable of being used for marking and scribing operations;

FIG. 2 is an enlarged cross-sectional view taken at line 2—2 of FIG. 1;

FIG. 3 is an enlarged partial end elevational view taken at line 3—3 of FIG. 1;

FIG. 4 is an enlarged, partial elevational view corresponding to the view shown in FIG. 1;

FIG. 5 is a side elevational view of a modified scribe saw of this invention;

FIG. 6 is an enlarged cross-sectional view taken at line 6—6 of FIG. 5; and

FIG. 7 is an enlarged cross-sectional view taken at line 7—7 of FIG. 5.

The accompanying drawings are primarily intended so as to clearly illustrate two presently preferred embodiments or forms of scribe saws of this invention. Those skilled in the art of constructing power operated equipment for the meat industry will realize that other differently appearing scribe saws may be easily constructed on the basis of the disclosure embodied within the accompanying drawings and described in this specification so as to utilize the inventive features defined in the appended claims.

As an aid to understanding this invention it can be stated in essentially summary form that it concerns scribe saws which are formed utilizing a conventional power operated saw having a housing, motor means mounted on the housing and a saw blade mounted on the motor means so as to be capable of being rotated with respect to the housing and at least one handle attached to the housing so as to extend from it by adding to such a saw gauge means in the nature of a lever and means for positioning the gauge means with respect to the housing and the saw blade so as to achieve cuts of various depths.

The actual details of this invention are best more fully described by referring directly to the accompanying drawings. Here there is shown a complete scribe saw 10 of this invention which includes a housing 12 having a blade guard 14 formed on it. A combined motor and transmission unit 16 is mounted upon the housing so as to serve to drive a shaft 18 carrying a circular saw blade 20. The blade 20 rotates with respect to the guard 14 in the established manner.

The particular saw 10 illustrated also includes a first handle 22 which is normally held in a vertical direction as shown in FIG. 1. A small eye 24 is pivotally attached to the handle 22 so that the entire saw 10 may be supported by means of a conventional cable (not shown) or the like. The handle 22 carries a bell-crank shaped trigger 26 mounted for rotation about a pivot pin 28. An extremity of the trigger 26 is adapted to engage an actuator 30 attached to a valve 32 so as to control the operation of this valve. The valve 32 is operatively connected to the motor and transmission unit 16 so as to control the flow of air through air hoses 34 in order to govern the operation of this unit 16. The valve 32 is mounted upon the housing 12.

This housing 12 also carries a second or other handle 36 having a grip portion 38 and a bottom connection portion 40. The portion 40 and the adjacent part of the portion 38 are provided with an elongated slot 42 extending generally parallel to the plane of the blade 20 along the side of the blade remote from the unit 16. The connecting portion 40 is provided with a centrally located bearing opening 44 which is adapted to hold a small shaft 46. This shaft 46 is normally locked in place by means of a split ring retainer 48 attached to it so as to engage a shoulder 50 in the bearing opening 44 and by means of an enlarged head 52 fitting against the exterior of the connecting portion 40. This head carries an elongated resilient arm 54 having a bump 56 formed on it so as to generally face the portion 40. This bump 56 is adapted to fit within any one of a series of depressions 58 in a positioning disc 60 which is secured to the portion 40 by means of screws 62.

The shaft 46 carries a small cylindrical pin 64 which extends from it (the shaft 46) across the interior of the slot 42. This pin 64 fits within a correspondingly shaped cylindrical hole 66 formed in an elongated gauge lever 68 intermediate the ends of this lever. From a consideration of the foregoing it will be realized that this gauge lever is rotatably mounted about the pin 64 and that it extends through the slot 42. With this construction the gauge lever 68 exends generally parallel to the plane of the blade 20 so that a curved end 70 of this lever 68 is spaced a short distance away from the blade 20. This curved end 70 is provided with a circular outer edge 72 having a curvature corresponding to the curvature of the outer edge of the blade 20. If desired, the extremity of the gauge lever 68 remote from the curved end 70 may be termed a control end; it carries a small handle 76 which is adapted to be used or manipulated in positioning the lever 68.

In the saw 10 the grip portion 38 is provided with a small slot 78 which is traversed by a pivot pin 80; this pivot pin 80 rotatably carries a locking handle 82 in such a manner that this handle 82 may be engaged at the time the grip portion 38 is engaged so as to be rotated in order to remove a latch or extremity 84 from within the interior of the slot 42. Preferably a small coil spring 86 is located within a hole 88 in the grip portion 38 so as to bias the extremity 84 in such a position that it normally extends across the slot 42. In the saw 10 a small spring biased safety catch 90 of known design is mounted on the handle 36 at about the area where the portions 38 and 40 are connected together so as to normally extend across the slot 42. During the utilization of the saw 10 the handles 22 and 36 are, of course, engaged in the known manner; similarly to operate this saw the trigger 26 is also manipulated in an established manner in order to actuate the valve 32. For various scribing operations the guide lever 68 may be located in a position as shown in FIG. 1 so that the edge 72 is spaced only a short distance from the edge of the blade 20. In order to obtain various depths of cuts, the arm 54 may be moved so as to change the location of the bump 56 to other than the particular depression 58 with which this bump 56 is shown in contact in FIG. 2.

Normally it is preferred to provide spring means in order to bias the guide lever 68 toward other than a scribing position as indicated in FIG. 1 of the drawings so as to prevent this guide lever 68 from tending to rotate to a scribing position. Such spring means may consist of an elongated wire spring 92 having a U-shaped central portion 94 extending over and engaging the lever 68 and having coil spring terminal portions 96 located within the holes 98 within the connection portion 40 on opposite sides of the slot 42. Each of these portions 96 includes an end 100 which engages a small correspondingly shaped hole 102 extending from the base of a hole 98.

When it is desired to utilize the saw 10 for other than scribing operations the locking handle 82 may be engaged so as to rotate the extremity 84 out of the slot 42. The spring 92 then rotates the lever 68 against the catch 90. Of course during this operation the arm 54 is moved with respect to the disc 60. When it is desired to move the guide lever 68 to a completely "out of the way" position so as to facilitate replacement of the blade 20 the safety catch 90 may be released so as to allow the guide lever 68 to be rotated by the spring 92 so that the handle 76 is in the position shown in phantom in FIG. 1. When the guide lever 68 has been moved to this position this guide lever 68 may be rotated back generally within the slot 42 through engagement of the handle 76 when the catch 90 and the handle 82 are held so as to permit such movement.

In FIGS. 5, 6 and 7 of the drawings there is shown a modified scribe saw 110 of the present invention which is very similar to the saw 10 previously described. This saw 110 includes a housing 112 carrying a combined motor and transmission unit 114 which is adapted to rotate a shaft 116 which in turn carries a circular saw blade 118. The housing 112 carries a blade guard 120 and first and second handles 122 and 124; a trigger 126 is rotatably mounted on the handle 124 through the use of a pivot pin 128 of the saw 110. During the use of the saw 110 the trigger 126 may be engaged in order to rotate an extremity 130 of this trigger in contact with an actuator 132 in order to control the operation of a valve 134. This valve 134 is operatively connected with the unit 114 in a known manner. It is used to control the flow of air through air lines 136 in order to operate the unit 114.

In the saw 110 a small slot 138 is provided with the extremity of the housing 112 adjacent to one end of the blade guard 120. This slot 138 is traversed by a pin 140 which is rotatably mounted upon the housing 112. The pin itself 140 is secured to and engaged by a gauge lever 142 which extends in a plane generally parallel to the blade 118. This lever 142 has an edge 144 of a circular configuration corresponding to the configuration of the periphery of the blade 118. A small bushing 146 may be located around the pin 140 for the purpose of holding the lever 142 so it can only rotate in a single plane. On the exterior of the housing 112 the pin 140 is connected to an elongated, resilient arm 148 having a bump 150 formed on it. This bump is adapted to fit within a series of depressions 152 in a small disc 154 secured to the housing 112 through the use of a set screw 156.

From a consideration of the foregoing description of the saw 110 it will be realized that it may be used in essentially the same manner as the manner in which the saw 10 may be used, and that through appropriate manipulation of the arm 148 the position of the gauge lever 142 may be adjusted for specific scribing operations.

From a consideration of the preceding description of two different embodiments of this invention those skilled in the art to which this invention pertains will realize that scribe saws as herein described may be easily constructed with a minimum amount of difficulty, and that these saws may be easily maintained as to both operativeness and cleanliness. Those familiar with the meat industry will further realize that scribe saws as herein described are very efficient for their intended purposes.

I claim:

In a power operated saw having a housing, a circular saw blade rotatably mounted on said housing, means for rotating said saw blade mounted on said housing and operatively secured to said saw blade, the improvement which comprises:

gauge means pivotally mounted on said housing so as to be capable of being rotated to various positions with respect so said saw blade, said gauge means extending parallel to the plane of said saw blade and including a curved end having an edge corresponding to the peripheral shape of said saw blade, said edge being located adjacent to the periphery of said saw blade in at least one position of said gauge means;

said gauge means including a lever arm extending beyond said second axis in the direction opposite to that of said curved end, whereby said gauge means and said lever arm move together in the same rotary direction about said second axis, said lever being disposed in slot in said housing opening in a direction of movement of said lever arm to move said gauge means away from said plane of said saw to expose said saw blade for full depth sawing, spring means biasing said lever arm in said direction of movement, and releasable stop means positioned between a position in said slot to prevent passage of said lever arm from said slot and a position out of said slot to permit said spring means to cause said lever arm to move out of said slot.

References Cited in the file of this patent

UNITED STATES PATENTS 2,987,084    Mandell  --------------- June 6, 1961

UNITED STATES PATENT OFFICE
CERTIFICATE OF CORRECTION

Patent No. 3,115,910                              December 31, 1963

Ezekiel C. Steiner

It is hereby certified that error appears in the above numbered patent requiring correction and that the said Letters Patent should read as corrected below.

Column 2, line 54, for "exends" read -- extends --; column 3, line 5, "During the utilization" should start another paragraph; column 4, line 17, for "as" read -- to --; line 38, for "so" read -- to --; same column 4, between lines 44 and 45, insert the following:

a bearing located within said housing, a shaft rotatably mounted within said bearing so as to rotate within said housing on a first axis, means to maintain said shaft within said bearing, a pivot pin mounted on said shaft, said pivot pin having a second axis parallel to and separated from said first axis so that upon rotation of said shaft within said housing said pivot pin rotates about said first axis, bearing means within said gauge means, said pivot pin engaging in said bearing means in said gauge means so that said gauge means is rotatable about said second axis so that upon rotation of said shaft about said first axis, said gauge means is adjusted with respect to said housing;
means to lock said shaft with respect to said housing so that it is maintained irrotatable about the first axis;

Signed and sealed this 30th day of June 1964.

(SEAL)
Attest:

ERNEST W. SWIDER                                      EDWARD J. BRENNER

Attesting Officer                                     Commissioner of Patents